(12) United States Patent
Hung et al.

(10) Patent No.: US 11,671,285 B1
(45) Date of Patent: Jun. 6, 2023

(54) SIGNAL RECEIVING DEVICE

(71) Applicant: NANYA TECHNOLOGY CORPORATION, New Taipei (TW)

(72) Inventors: Shih-Cheng Hung, Taoyuan (TW); Cong-An Lu, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 17/826,186

(22) Filed: May 27, 2022

(51) Int. Cl.
*H04L 25/03* (2006.01)

(52) U.S. Cl.
CPC .. *H04L 25/03057* (2013.01); *H04L 25/03159* (2013.01)

(58) Field of Classification Search
CPC ............. H04L 25/03057; H04L 25/03159
See application file for complete search history.

(56) References Cited

U.S. PATENT DOCUMENTS

| | | | |
|---|---|---|---|
| 2001/0015677 A1 | 8/2001 | Choi | |
| 2006/0092804 A1* | 5/2006 | Otake | G11B 20/10481 369/59.22 |
| 2015/0052378 A1* | 2/2015 | Chen | H03L 7/087 711/103 |
| 2022/0085967 A1* | 3/2022 | Vrazel | H04L 7/033 |

FOREIGN PATENT DOCUMENTS

| | | |
|---|---|---|
| TW | 201306488 | 2/2013 |
| TW | 201832487 | 9/2018 |

OTHER PUBLICATIONS

"Office Action of Taiwan Counterpart Application", dated Oct. 6, 2022, p. 1-p. 5.

\* cited by examiner

*Primary Examiner* — Janice N Tieu

(74) *Attorney, Agent, or Firm* — JCIPRNET

(57) ABSTRACT

A signal equalization method includes: receiving a clock signal and a first reference signal; detecting a phase and a frequency of the clock signal based on the first reference signal to generate a detection result; generating a speed judgement signal according to the detection result; and, receiving the speed judgement signal and deciding an equalizer operation parameter according to the speed judgement signal.

15 Claims, 4 Drawing Sheets

SIGNAL RECEIVING DEVICE

BACKGROUND OF THE INVENTION

Technical Field

The present invention generally relates to a signal receiving device, and more particularly to an equalizer-based signal receiving device.

Description of Related Art

In conventional art, a controller of a platform needs to receive input signal and perform an equalization operation for improving quality of processed signals. For the controller disposed in different platforms, signals with different speed levels need to be processed by the controller; nevertheless, the speed levels cannot be distinguished by an equalizer-based receiver of the controller. In equalizer-based receiver, a front-end equalizer is easily influenced by the speed level of each of the input signals. Such as that, the equalizer-based receiver needs to be adjusted according to the speed level of corresponding input signal, and the influence of the controller is reduced.

SUMMARY OF THE INVENTION

The present invention provides a signal receiving device and a signal equalization method thereof which can perform equalization operation for different signal speed applications.

The signal receiving device structure includes a frequency detector, a speed judge circuit and an equalizer-based signal receiver. The frequency detector receives a clock signal and a first reference signal, and detects a phase and a frequency of the clock signal based on the first reference signal to generate a detection result. The speed judge circuit is coupled to the frequency detector and generates a speed judgement signal according to the detection result. The equalizer-based signal receiver is coupled to the speed judge circuit, receives the speed judgement signal and decides an equalizer operation parameter according to the speed judgement signal.

The signal equalization method includes: receiving a clock signal and a first reference signal; detecting a phase and a frequency of the clock signal based on the first reference signal to generate a detection result; generating a speed judgement signal according to the detection result; and, receiving the speed judgement signal and deciding an equalizer operation parameter according to the speed judgement signal.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
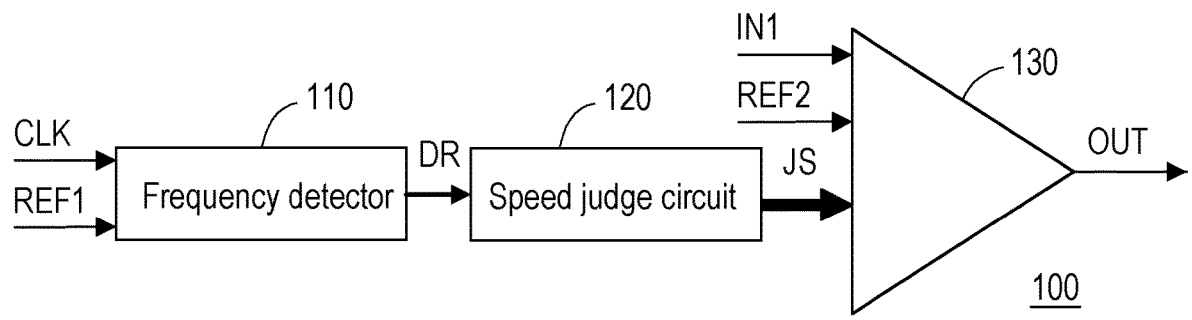
FIG. 1 illustrates a schematic diagram of a signal receiving device according to an embodiment of present disclosure.

Reference will now be made in detail to the present preferred embodiment of the invention, examples of which are illustrated in the accompanying drawings. Wherever possible, the same reference numbers are used in the drawings and the description to refer to the same or like parts.

Please refer to FIG. 1, which illustrates a schematic diagram of a signal receiving device according to an embodiment of present disclosure. The signal receiving device 100 includes a frequency detector 110, a speed judge circuit 120 and an equalizer-based signal receiver 130. The frequency detector 110 receives a clock signal CLK and a reference signal REF1. The frequency detector 110 detects a frequency and a phase of the clock signal CLK based on the reference signal REF1 to generate a detection result DR. In this embodiment, both of the clock signal CLK and the reference signal REF1 are periodic signals. The frequency detector 110 compares the frequency of the clock signal CLK with a frequency of the reference signal REF1, and compares the phase of the clock signal CLK with a phase of the reference signal REF1 to generate the detection result DR. In detail, the detection result DR may include a lead flag, a lag flag and a delta signal. If the frequency of the clock signal CLK is higher than the frequency of the reference signal REF1, the lead flag can be enabled by the frequency detector 110. If the frequency of the clock signal CLK is lower than the frequency of the reference signal REF1, the lag flag can be enabled by the frequency detector 110. Also, the frequency detector 110 may generate the delta signal according to different quantities of the phases and frequencies of the clock signal CLK and the reference signal REF1.

The speed judge circuit 120 is coupled to the frequency detector 110. The speed judge circuit 120 receives the detection result DR including the lead flag, the lag flag and the delta signal. The speed judge circuit 120 generates a speed judgement signal JS according to the detection result DR. The speed judge circuit 120 may generate the speed judgement signal JS which has a plurality of bits according to the lead flag, the lag flag and the delta signal. In detail, based on the lead flag and the lag flag which is enabled, the speed judge circuit 120 compares the delta signal with a plurality of threshold values to generates the plurality of bits of the speed judgement signal JS.

In detail, if the lead flag is enabled (the lag flag is disabled), the speed judge circuit 120 may generate the speed judgement signal JS according to the delta signal, where the speed judgement signal JS is positive relative to the delta signal. On the contrary, if the lag flag is enabled (the lead flag is disabled), the speed judge circuit 120 may generate the speed judgement signal JS according to the delta signal, where the speed judgement signal JS is negative relative to the delta signal.

For example, the speed judgement signal JS may have a plurality of bits FR1 to FRN, where the bit FR1 is a least significant bit (LSB) and the bit FRN is a most significant bit (MSB). When the lead flag is enabled and the delta signal is largest, the bit FRN may be enabled, and the other bits FR1 to FRN-1 may be disabled. When the lead flag is enabled and the delta signal is smallest, the bit FR1 may be enabled, and the other bits FR2 to FRN may be disabled. On the other hand, when the lag flag is enabled and the delta signal is smallest, the bit FRN may be enabled, and the other bits FR1 to FRN-1 may be disabled; and when the lag flag is enabled and the delta signal is largest, the bit FR1 may be enabled, and the other bits FR2 to FRN may be disabled.

Each of the lead flag and the lag flag may be implemented by one-bit register. If the lead flag is enabled and the lag flag is disabled, the lead flag may be at a first logic value, and the lag flag may be at a second logic value. If the first logic value is logic 1, and second logic value is logic 0. If the first logic value is logic 0, and second logic value is logic 1.

The equalizer-based signal receiver 130 is coupled to the speed judge circuit 120. The equalizer-based signal receiver 130 receives the speed judgement signal JS and decides an equalizer operation parameter according to the speed judgement signal JS. In this embodiment, the equalizer-based signal receiver 130 further receives an input signal IN1 and a reference signal REF2. The input signal IN1 and the reference signal REF2 may from a differential signal pair or a reference voltage. The equalizer-based signal receiver 130 performs a signal equalization operation on the input signal IN1 according to the speed judgement signal JS to generate an output signal OUT.

In detail, the equalizer-based signal receiver 130 can determine the equalizer operation parameter which is an equalizer feedback time or an equalizer strength according to the speed judgement signal JS. In one embodiment, the equalizer-based signal receiver 130 may perform the signal equalization operation according to the equalizer feedback time which is determined according to the speed judgement signal JS. In another embodiment, the equalizer-based signal receiver 130 may perform the signal equalization operation according to the equalizer strength which is determined according to the speed judgement signal JS.

Figure 2:
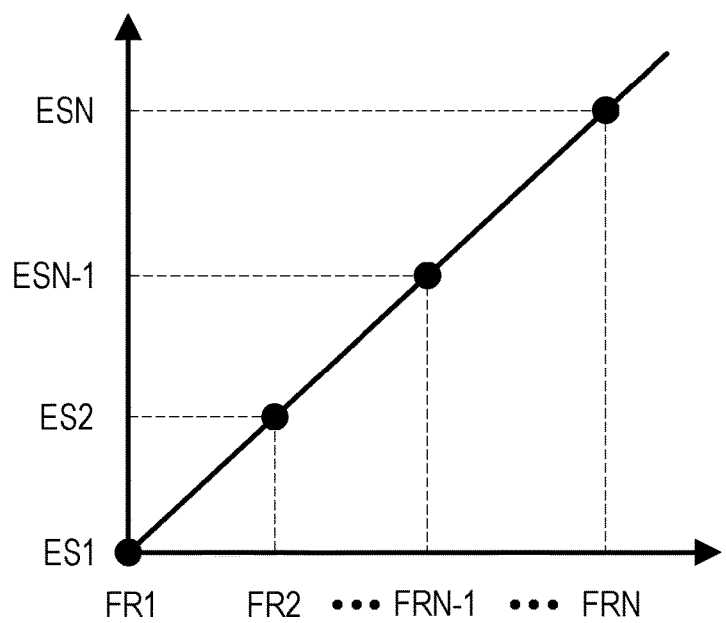
FIG. 2 illustrates a schematic plot of a relationship between the speed judgement signal, the lead flag, the lag flag and the threshold values according to an embodiment of present disclosure.

Please refer to FIG. 1 and FIG. 2 commonly, where FIG. 2 illustrates a schematic plot of the equalizer-based signal receiver for determining an equalizer strength of the equalization operation according to an embodiment of present disclosure. In FIG. 2, the speed judgement signal JS includes a plurality of bits FR1 to FRN, where the bits FR1 to FRN respectively correspond to a plurality of candidate equalizer strengths ES1 to ESN. The equalizer-based signal receiver 130 receive the speed judgement signal JS including the bits FR1 to FRN. The equalizer-based signal receiver 130 may determine the equalizer strength for performing the equalization operation by selecting one of the candidate equalizer strengths ES1 to ESN according to one of the bits FR1 to FRN which is enabled. For example, if the bit FR1 of the speed judgement signal JS is enabled (at a logic 1), the equalizer-based signal receiver 130 may determine the equalizer strength equals to the candidate equalizer strengths ES1. If the bit FRN of the speed judgement signal JS is enabled (at the logic 1), the equalizer-based signal receiver 130 may determine the equalizer strength equals to the candidate equalizer strengths ESN. In this embodiment, the candidate equalizer strengths ES1 may be 0, and if the equalizer strength is set to equal to the candidate equalizer strengths ES1, the equalization operation may be turned off.

Figure 3:
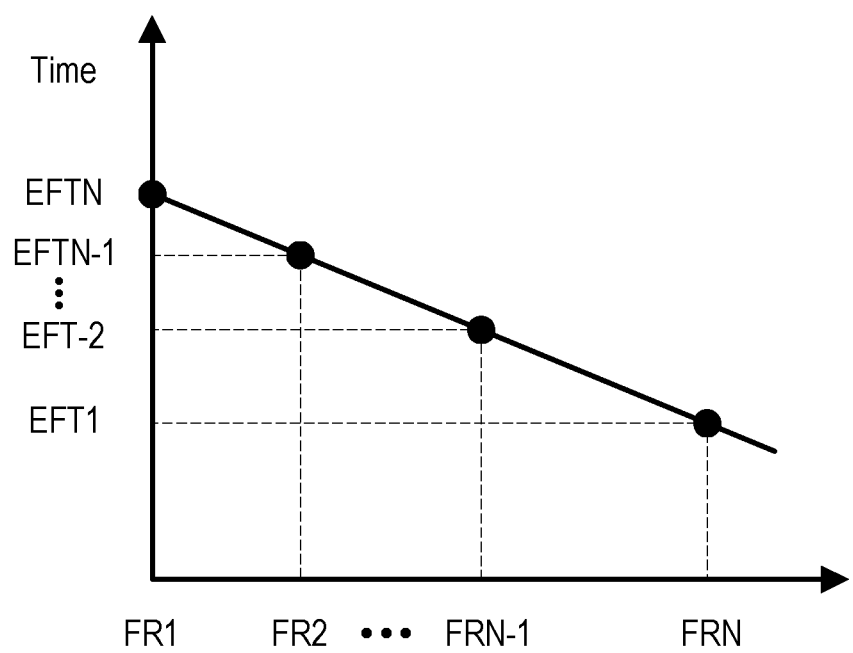
FIG. 3 illustrates a schematic plot of a relationship between the speed judgement signal and the speed judgement signal according to an embodiment of present disclosure.

Please refer to FIG. 1 and FIG. 3 commonly, where FIG. 3 illustrates a schematic plot of the equalizer-based signal receiver for determining an equalizer feedback time of the equalization operation according to another embodiment of present disclosure. In detail, the equalizer-based signal receiver 130 receives the bits FR1 to FRN of the speed judgement signal JS, and determines the equalizer feedback time of the signal equalization operation according to the enabled bit of the bits FR1 to FRN. In this embodiment, the bits FR1 to FRN of the speed judgement signal JS respectively correspond to a plurality of candidate feedback times EFTN to EFT1.

By referring to FIG. 3, if the bit FR1 is enabled, the equalizer-based signal receiver 130 may decide the equalizer feedback time as a highest candidate feedback time EFTN for performing the signal equalization operation. If the bit FR2 is enabled, the equalizer-based signal receiver 130 may decide the equalizer feedback time as the candidate feedback time EFTN-1 for performing the signal equalization operation. Also, if the bit FRN is enabled, the equalizer-based signal receiver 130 may decide the equalizer feedback time as a lowest candidate feedback time EFT1 for performing the signal equalization operation.

Please be noted here, the equalizer-based signal receiver 130 may include a decision feedback equalizer (DFE) or a linear equalizer for performing the signal equalization operation. The decision feedback equalizer or a linear equalizer may be implemented by any equalizer circuit well known by a person skilled in the art, and no special limitation here.

On the other hand, the frequency detector 110 can be implemented by any phase and frequency detecting circuit well known in this art. The speed judge circuit 120 can be implemented by a plurality of comparators and a logic circuit. When the delta signal is a digital code, the speed judge circuit 120 can, for example, use XOR gates to perform the comparison operations to generate the detection result. In some embodiment, the delta signal may be a timing information, and the speed judge circuit 120 may sample the timing information to convert the delta signal to a digital code.

In present disclosure, the signal receiving device 100 of present disclosure may adjust the equalizer feedback time for the equalization operation corresponding to different input speed level. That is, the signal receiving device 100 can be applied in a circuit operated in different platforms, and the equalization operation can be performed well in the signal receiving device.

Figure 4:
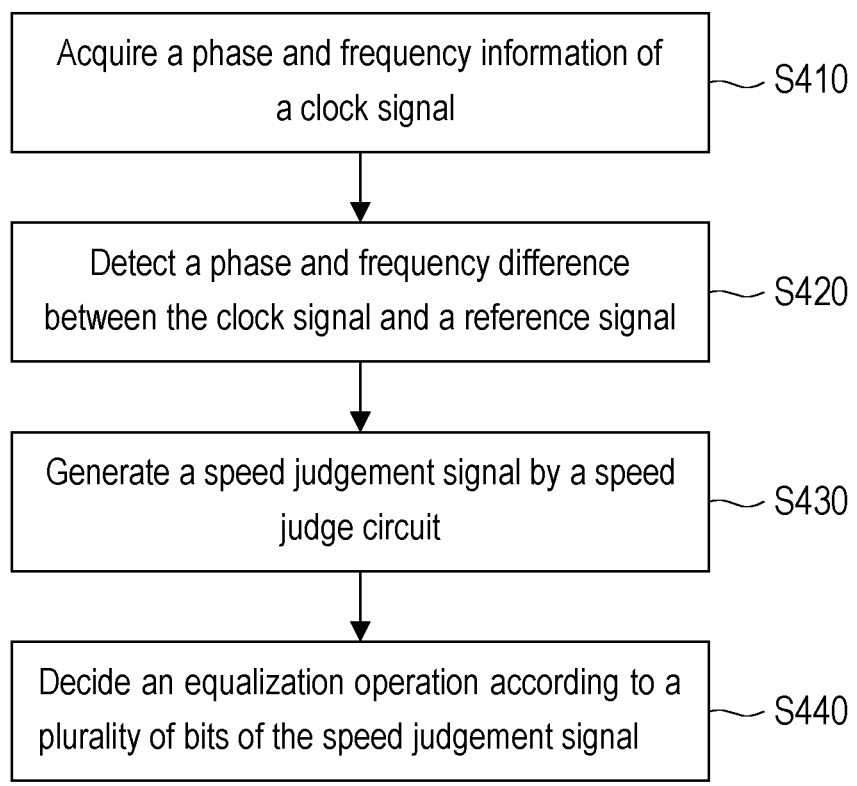
FIG. 4 illustrates a flow chart of a signal equalization method according to an embodiment of present disclosure.

Please refer to FIG. 4, which illustrates a flow chart of a signal equalization method according to an embodiment of present disclosure. In a step S410, phase and frequency information of a clock signal are acquired by a frequency detector. Then, in a step S420, the phase and frequency difference between the clock signal and a reference signal can be detected by the frequency detector. Such as that, input speed level can be detected by the frequency detector.

In a step S430, a speed judgement signal can be generated by the speed judge circuit. The speed judge circuit can generate the speed judgement signal according to a detection result obtained in the step S420. Detail for obtaining the speed judgement signal has been described in previous embodiments, and no more repeated description here.

In a step S440, an equalization operation can be decided according to a plurality of bits of the speed judgement signal by an equalizer-based signal receiver. In detail, the equalizer-based signal receiver can determine an equalizer operation parameter of the equalization operation according to the bits of the speed judgement signal obtained in the step S430.

Figure 5:
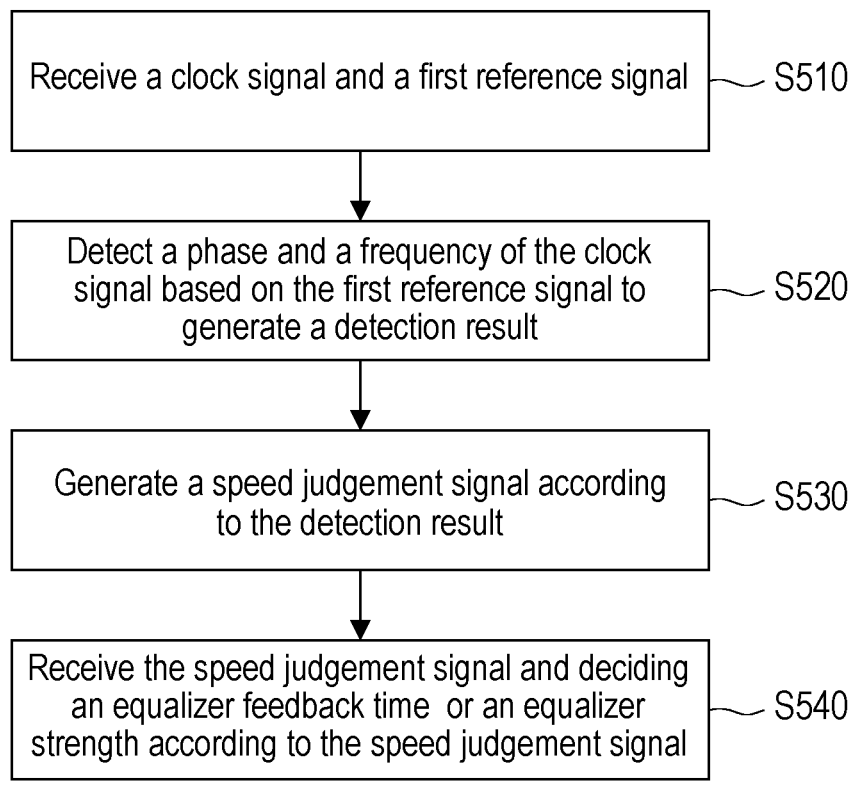
FIG. 5 illustrates a flow chart of a signal equalization method according to another embodiment of present disclosure.

Please refer to FIG. 5, which illustrates a flow chart of a signal equalization method according to another embodiment of present disclosure. In a step S510, a clock signal and a first reference signal are received by a frequency detector. In a step S520, a phase and a frequency of the clock signal may be detected based on the first reference signal to generate a detection result by the frequency detector. In a step S530, a speed judgement signal may be generated according to the detection result by a speed judge circuit. In a step S540, an equalizer feedback time or an equalizer strength may be decided according to the speed judgement signal by an equalizer-based signal receiver. Then, the equalizer-based signal receiver may perform an equalization operation on an input signal according to the equalizer feedback time, where the equalizer feedback time can be well adjusted according to a speed level of the input signal.

In summary, the signal receiving device of present disclosure provides a frequency detector for detecting a phase and a frequency of the clock signal, and provides a speed judge circuit to convert the phase and frequency of the clock signal to a speed judgement signal which may be a digital code. Such as that, the equalizer-based signal receiver can adjust an equalizer feedback time according to the speed judgement signal, and an equalization operation of the equalizer-based signal receiver can be performed efficiency on the input signals with different speed level.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A signal receiving device, comprising:
    a frequency detector, receiving a clock signal and a first reference signal, and detecting a phase and a frequency of the clock signal based on the first reference signal to generate a detection result;
    a speed judge circuit, coupled to the frequency detector, generating a speed judgement signal according to the detection result; and
    an equalizer-based signal receiver, coupled to the speed judge circuit, receiving the speed judgement signal and deciding an equalizer operation parameter according to the speed judgement signal.

2. The signal receiving device according to claim 1, wherein the detection result comprises a lead flag, a lag flag and a delta signal, and the frequency detector enables the lead flag or the lag flag by detecting whether a phase of the clock signal is lead or lag to a phase of the reference signal, and the frequency detector generates the delta signal according to difference quantity of phases and frequencies between the clock signal and the first reference signal.

3. The signal receiving device according to claim 2, wherein the speed judge circuit generates the speed judgement signal which has a plurality of bits according to the lead flag, the lag flag and the delta signal.

4. The signal receiving device according to claim 3, wherein when the lead flag is enabled, the speed judgement signal is positive relative to the delta signal.

5. The signal receiving device according to claim 3, wherein when the lag flag is enabled, the speed judgement signal is negative relative to the delta signal.

6. The signal receiving device according to claim 3, wherein the speed judge circuit compares the delta signal with a plurality of threshold values to generate the plurality of bits of the speed judgement signal, wherein the plurality of threshold values are respectively corresponding to the plurality of bits of the speed judgement signal.

7. The signal receiving device according to claim 6, wherein the equalizer-based signal receiver further receives an input signal and a second reference signal, the equalizer-based signal receiver performs a signal equalization operation on the input signal according to the speed judgement signal.

8. The signal receiving device according to claim 7, wherein the equalizer-based signal determines an equalizer feedback time or an equalizer strength according to one of the plurality of bits of the speed judgement signal which is enabled.

9. A signal equalization method, comprising:
    receiving a clock signal and a first reference signal;
    detecting a phase and a frequency of the clock signal based on the first reference signal to generate a detection result;
    generating a speed judgement signal according to the detection result; and
    receiving the speed judgement signal and deciding an equalizer operation parameter according to the speed judgement signal.

10. The signal equalization method according to claim 9, wherein the detection result comprises a lead flag, a lag flag and a delta signal, a step of detecting the phase and the frequency of the clock signal based on the first reference signal to generate the detection result comprises:
    enabling the lead flag or the lag flag by detecting whether a phase of the clock signal is lead or lag to a phase of the reference signal; and
    generating the delta signal according to difference quantity of phases and frequencies between the clock signal and the first reference signal.

11. The signal equalization method according to claim 10, wherein a step of generating the speed judgement signal according to the detection result comprises:
    generating the speed judgement signal which has a plurality of bits according to the lead flag, the lag flag and the delta signal.

12. The signal equalization method according to claim 11, wherein when the lead flag is enabled, the speed judgement signal is positive relative to the delta signal; and when the lag flag is enabled, the speed judgement signal is negative relative to the delta signal.

13. The signal equalization method according to claim 11, wherein the step of generating the speed judgement signal according to the detection result further comprises:
    comparing the delta signal with a plurality of threshold values to generate the plurality of bits of the speed judgement signal, wherein the plurality of threshold values are respectively corresponding to the plurality of bits of the speed judgement signal.

14. The signal equalization method according to claim 9, wherein a step of receiving the speed judgement signal and deciding an equalizer feedback time or an equalizer strength according to the speed judgement signal comprises:
    receiving an input signal and a second reference signal; and
    performing a signal equalization operation on the input signal according to the speed judgement signal.

15. The signal equalization method according to claim 14, wherein the step of receiving the speed judgement signal and deciding the equalizer operation parameter according to the speed judgement signal further comprises:
 generating an equalizer feedback time or an equalizer strength according to one of the plurality of bits of the speed judgement signal which is enabled.

* * * * *